United States Patent
Ammann et al.

(10) Patent No.: US 6,585,418 B2
(45) Date of Patent: Jul. 1, 2003

(54) HYDRODYNAMIC AXIAL BEARING WITH FLOATING DISK

(75) Inventors: Bruno Ammann, Baden (CH); Jürgen Prossel, Waldshut-Tiengen (DE)

(73) Assignee: ABB Turbo Systems AG, Baden (CH)

( * ) Notice: Subject to any disclaimer, the term of this patent is extended or adjusted under 35 U.S.C. 154(b) by 0 days.

(21) Appl. No.: 09/972,921

(22) Filed: Oct. 10, 2001

(65) Prior Publication Data

US 2002/0136474 A1 Sep. 26, 2002

(30) Foreign Application Priority Data

Oct. 17, 2000 (EP) .............................................. 00810959

(51) Int. Cl.[7] .............................................. F16C 17/04
(52) U.S. Cl. ......................... 384/123; 384/99; 384/100; 384/276
(58) Field of Search ................................. 384/123, 124, 384/99, 100, 101, 276; 360/107

(56) References Cited

U.S. PATENT DOCUMENTS

| | | | |
|---|---|---|---|
| 1,786,565 A | | 12/1930 | Freeman |
| 4,449,841 A | * | 5/1984 | Brandenstein et al. ........ 403/24 |
| 4,961,122 A | * | 10/1990 | Sakai et al. ............... 360/271.3 |
| 5,114,245 A | * | 5/1992 | Tanaka et al. ............... 384/112 |
| 5,223,758 A | * | 6/1993 | Kataoka et al. ............... 310/90 |
| 5,246,352 A | | 9/1993 | Kawakami |
| 5,289,067 A | * | 2/1994 | Tanaka et al. .............. 310/90.5 |
| 5,370,463 A | * | 12/1994 | Asada et al. ................. 384/113 |
| 5,559,382 A | * | 9/1996 | Oku et al. ...................... 310/90 |
| 5,707,154 A | * | 1/1998 | Ichiyama ..................... 384/107 |
| 5,724,213 A | * | 3/1998 | Kim ........................... 360/271.3 |
| 5,751,080 A | * | 5/1998 | Hong ........................ 310/67 R |
| 5,828,148 A | * | 10/1998 | Niggemann et al. ........... 310/86 |
| 6,024,495 A | * | 2/2000 | Loos et al. ................... 384/123 |
| 6,155,720 A | * | 12/2000 | Battig ............................ 384/99 |
| 6,200,035 B1 | * | 3/2001 | Otsuki ......................... 384/123 |
| 6,250,807 B1 | * | 6/2001 | Mori et al. ................... 384/100 |
| 6,305,439 B1 | * | 10/2001 | Pool et al. ....................... 141/4 |
| 6,341,896 B1 | * | 1/2002 | Miura et al. ................. 384/115 |

FOREIGN PATENT DOCUMENTS

| | | |
|---|---|---|
| DE | 49087 | 7/1966 |
| DE | 3244893 C2 | 6/1983 |
| DE | 4311117 A1 | 10/1994 |
| DE | 19641673 A1 | 4/1998 |
| GB | 1095999 | 12/1967 |

* cited by examiner

Primary Examiner—David A. Bucci
Assistant Examiner—Julie K. Smith
(74) Attorney, Agent, or Firm—Burns, Doane, Swecker & Mathis, L.L.P.

(57) ABSTRACT

In a hydrodynamic axial bearing (10), a rotating body (13) is mounted radially in a radial bearing (17) of a bearing body (18). The rotating body (13) comprises a shaft (16), with its shaft journal (14) mounted in the radial bearing (17), and a bearing collar (20) which is connected fixedly to the shaft (16) and corotates with the shaft (16). A floating disk (12) is arranged in an annular-groove-shaped space (28) between a wall (26) of the fixed bearing body (18) and a projection (22) of the corotating bearing collar (20). The floating disk (12) has a central circular orifice (30) which is designed as an integrated hydrodynamic radial bearing (32). By means of this radial bearing (32), the floating disk (12) is mounted radially on a fixed bearing element (38) concentrically surrounding the rotating body (13) on a portion (29).

9 Claims, 5 Drawing Sheets

HYDRODYNAMIC AXIAL BEARING WITH FLOATING DISK

DESCRIPTION

1. Technical Field

The invention relates to a hydrodynamic axial bearing with floating disk according to the preamble of patent claim 1.

2. Prior Art

In order to improve the skew compensation capacity and the wear behavior in hydrodynamic axial bearings, for example of turbochargers, what are known as floating disks may be inserted between the bearing collar rotating at the shaft rotational speed and the nonrotating casing. Examples of this are found, inter alia, in U.S. Pat. No. 1,786,565 and GB-1,095,999. The radial guidance of the floating disk takes place on the rotating body, that is to say on the shaft or on the bearing collar, by means of a radial bearing integrated into the floating disk, as disclosed, for example, in DE-A-196 41 673. The lubrication of such a hydrodynamic axial bearing is carried out, as a rule, by means of lubricating oil from a specific lubricating-oil system or, in the case of turbochargers, via the lubricating-oil system of an internal combustion engine connected to the turbocharger.

During operation, a load-bearing lubricating-oil film builds up between the floating disk rotating at only about half the rotor rotational speed and the shaft or the bearing collar. In the case of pronounced radial oscillations of the shaft, for example due to unbalance, however, overloading of the radial bearing of the floating disk and wear in the radial bearing of the floating disk may occur.

PRESENTATION OF THE INVENTION

The object of the present invention is, therefore, to provide a hydrodynamic axial bearing with floating disk, in which overloading of the radial bearing of the floating disk is largely ruled out.

This object is achieved by means of a hydrodynamic axial bearing according to the features of patent claim 1.

By means of the radial mounting of a floating disk on a fixed bearing element concentrically surrounding the rotating body of an axial bearing, oscillations and jolts of the rotating body in the uncoupling gap between the bearing element and the rotating body are intercepted and kept away from the radial bearing of the floating disk. Overloading of the radial bearing and wear in the radial bearing of the floating disk are thereby avoided.

A one-piece version of the bearing element and bearing body is highly advantageous, since this makes particularly simple and cost-effective production possible.

However, a two-part design of the bearing element and bearing body may also be advantageous when the bearing body is manufactured, for example, as a casting and the bearing element is to acquire high wear resistance by virtue of a special choice of material or surface treatment.

In such a case, a fixed and releasable connection between the bearing element and bearing body is highly advantageous, since it simplifies the production and assembly of the hydrodynamic axial bearing.

A press fit is highly suitable as a fixed connection between the bearing element and bearing body. The press fit ensures that the bearing element is fixed in relation to the rotating body and to the rotating floating disk and is simple in terms of production and reliable during operation.

The bearing element has, for the press fit, a fitting part held in the press seat. It is particularly advantageous for the fitting part to be provided with a recess. The bearing element can thereby be fitted more simply into the press seat, and the deformation of the bearing element in the region of the bearing seat, this being caused by the press fit, can be kept low. The recess may at the same time be utilized highly advantageously as a lubricating-oil reservoir for the lubrication of the floating disk.

It is particularly advantageous to provide a closed bush as bearing element, in order largely to avoid a reduction in the uncoupling properties due to lubricating oil in the uncoupling gap.

The uncoupling gap between the bearing element and the rotating body may advantageously be produced in the form of a wide tolerance gap. Lubricating oil penetrating into the uncoupling gap then cannot reduce the uncoupling properties.

The bearing element may advantageously be designed in such a way that lubricating oil passes via the bearing element into the radial bearing of the floating disk and into the lubricating gaps surrounding the latter.

For this purpose, for example, the bearing element may be connected conductively to a lubricating-oil feed and that surface of the bearing body which cooperates with the floating disk may be profiled in such a way that a connection permeable to the lubricating oil is made between the lubricating-oil gaps via this profile. Such a profile may be designed in such a way that it functions as a hydrodynamic radial bearing for the floating disk and the floating disk itself does not need to have an integrated radial bearing.

Moreover, connecting orifices may be provided in the bearing body, which issue into the radial bearing and the lubricating gaps and are connected to a lubricating-oil feed line, so that the lubricating oil can be fed directly into the lubricating-oil gaps and the radial bearing. These connecting orifices may be provided, in addition to the profile or else without a profile, on the outside of the bearing element.

Further preferred embodiments of the hydrodynamic axial bearing are the subject matter of further dependent patent claims.

BRIEF DESCRIPTION OF THE DRAWINGS

The subject of the invention is explained in more detail below with reference to the prior art and to two preferred exemplary embodiments. In the purely diagrammatic drawing.

The reference symbols used in the drawings and their significance are summarized in the list of reference symbols. Identical parts are in principle given the same reference symbols in the figures. The embodiments described are examples of the subject of the invention and have no restrictive effect.

EMBODIMENTS OF THE INVENTION

Figure 1:
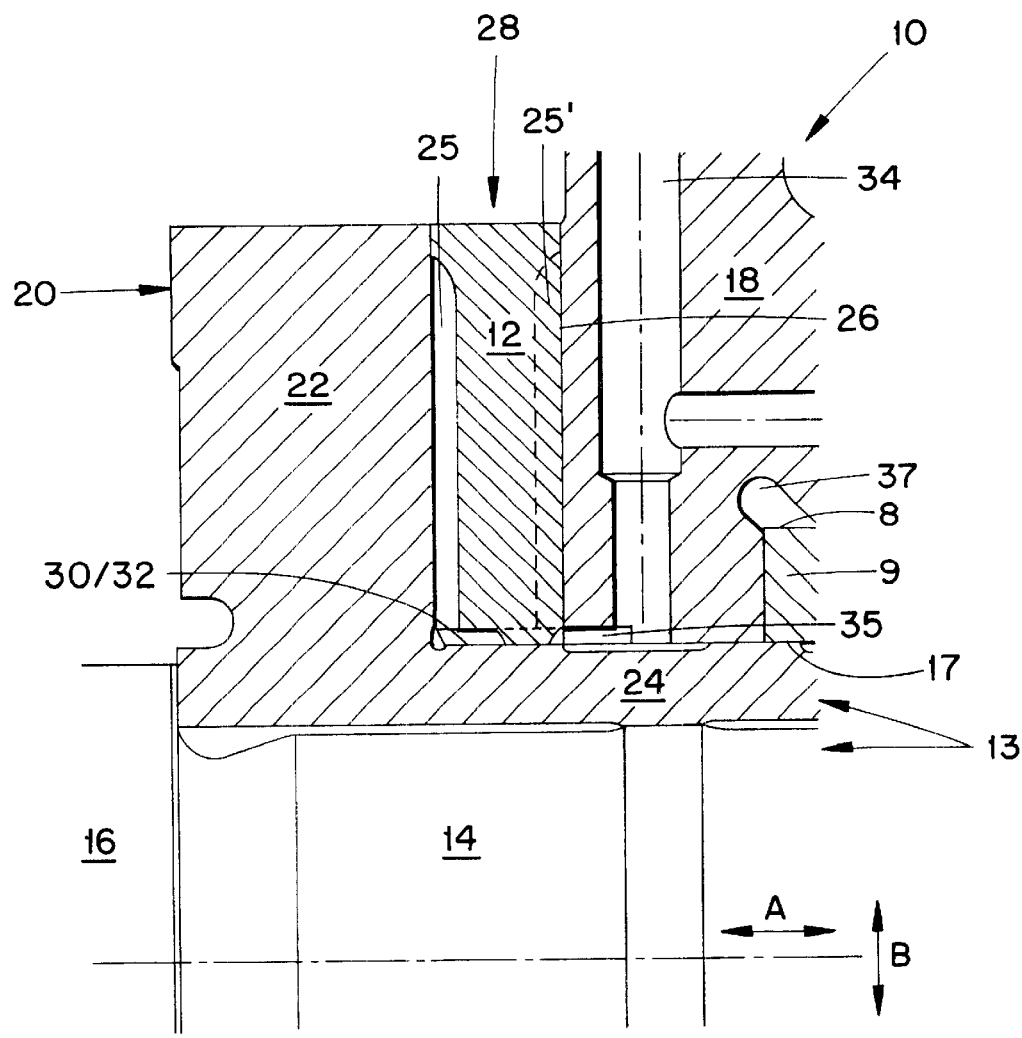
FIG. 1 shows a hydrodynamic axial bearing with floating disk according to the prior art in a section along the longitudinal axis of the rotating body of the axial bearing.

FIG. 1 shows a hydrodynamic axial bearing 10 with a floating disk 12 according to the prior art, such as is used, for example, in a turbocharger. The axial bearing 10 comprises a bearing body 18, in which a radial bearing 17 for the radial mounting of a rotating body 13 is formed. The radial bearing 17 is implemented by a radial bearing element 9 which is fitted into a radial bearing recess 8 of the bearing body 18. In this example, the rotating body 13 comprises a shaft 16 with a bearing journal 14 and with a bearing collar 20. The bearing collar 20 has a circular-disk-shaped projection 22 projecting radially outward perpendicularly from the shaft 16 and a part 24 surrounding the bearing journal 14 and extending in the axial direction (A). The bearing journal 14 and the bearing collar 20 are connected fixedly to one another, for example by means of a press fit, so that the bearing collar 20 corotates with the shaft 16 at the same rotational speed. The bearing journal 14 and the part 24 of the bearing collar 20 extend into the radial bearing 17 and are received by the latter.

The projection 22 of the bearing collar 20 is located outside the radial bearing 17 and, together with a wall 26 of the bearing body 18, forms an annular-groove-shaped space 28. The floating disk 12 is arranged in this space 28. The space 28 and the floating disk 12 are dimensioned in such a way that there are lubricating-oil gaps 25, 25' between the floating disk 12 and the wall 26 and also between the floating disk 12 and the projection 22. The floating disk 12 or the wall 26 and the projection 22 are profiled so as to limit the respective lubricating-oil gap 25, 25' in such a way that, during operation, the arrangement, together with the lubricating oil fed into the annular-groove-shaped space 28, forms a hydrodynamic axial bearing. The floating disk 12 has a central circular orifice 30, by means of which it is mounted radially on the rotating body 13. The central circular orifice 30 is designed as a hydrodynamic radial bearing 32 of the floating disk 12 and, during operation, together with the lubricating oil fed into the annular-groove-shaped space 28, forms a lubricating-oil film which lubricates the radial bearing 32. The supply of lubricating oil to the lubricating-oil gap 25' formed between the floating disk 12 of the projection 22 is also ensured via the profiled circular orifice 30. An example of such a profiling of the floating disk 12 or of the elements 22, 26 limiting the space 28 and also of the design of the radial bearing is described in DE-A-196 41 673.

The lubricating oil is fed (not illustrated) from a specific lubricating-oil system or, for example, in the case of a turbocharger, from a lubricating-oil system of an internal combustion engine connected to the turbocharger. The feed takes place in a known way, for example, via a radial feed duct 34 which is connected at its radially inner end to the annular-groove-shaped space 28 by means of an annular duct 35. The radial bearing 17, too, is supplied with lubricating oil which is discharged via an oil duct 37. In the case of pronounced radical oscillations (arrow B) of the rotating body 13, overloading of the lubricating-oil film between the floating disk 12 and the rotating body 13 may occur. This results in wear or even damage to the bearing.

Figure 2:
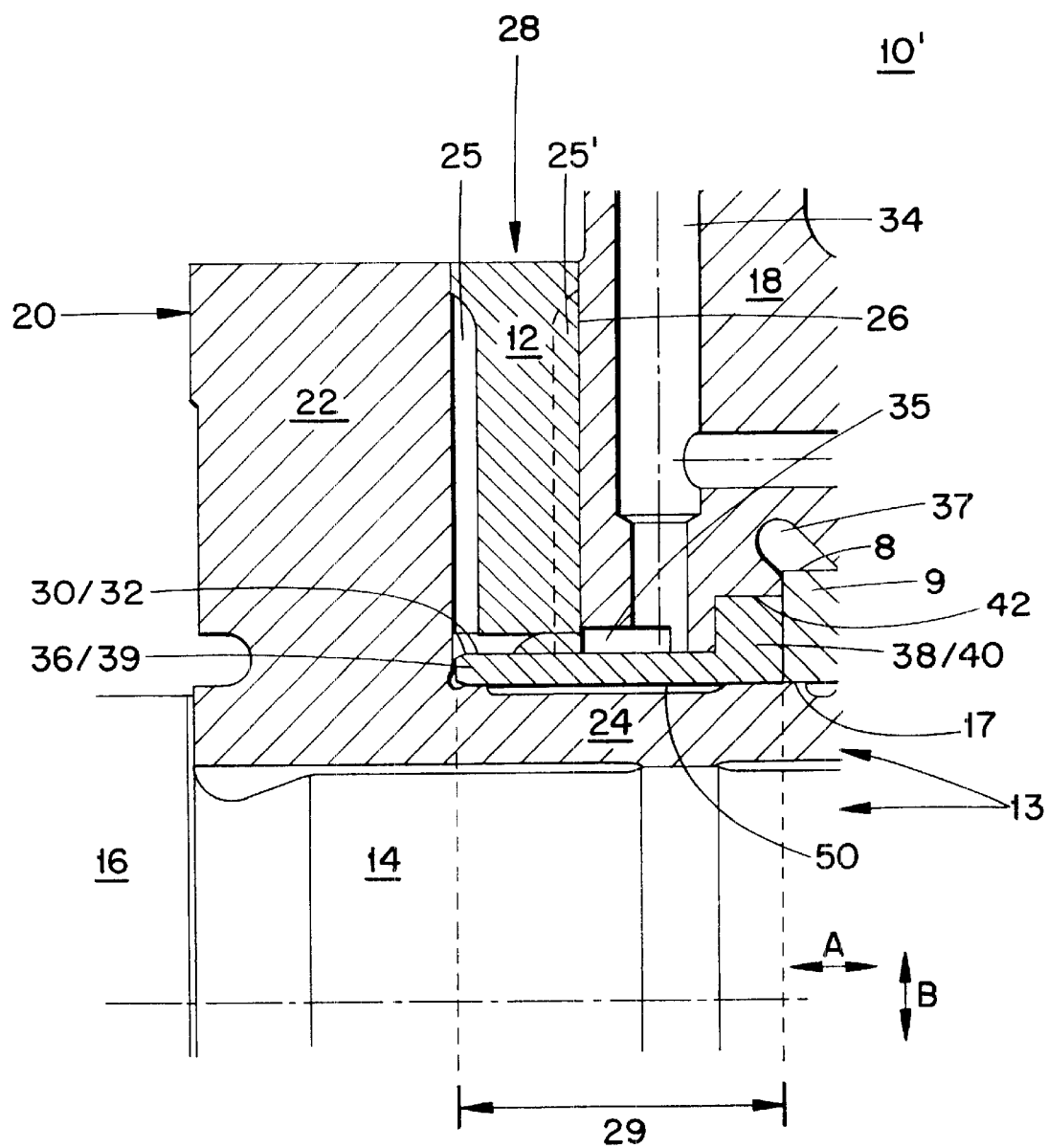
FIGS. 2 to 5 show various embodiments of the hydrodynamic axial bearing according to the invention with floating disk in a section along the longitudinal axis of the rotating body of the axial bearing.
Figure 3:
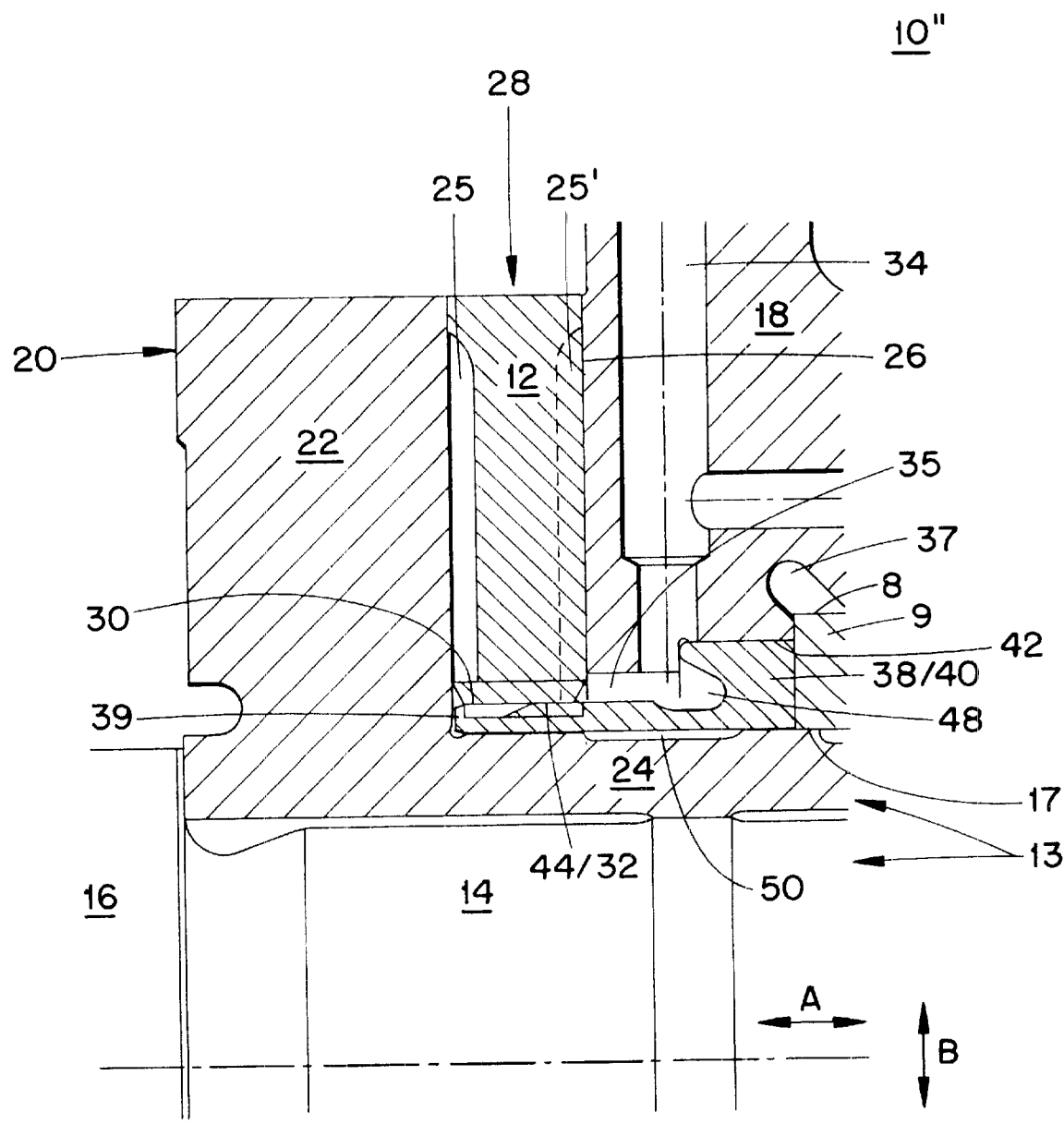
Figure 4:
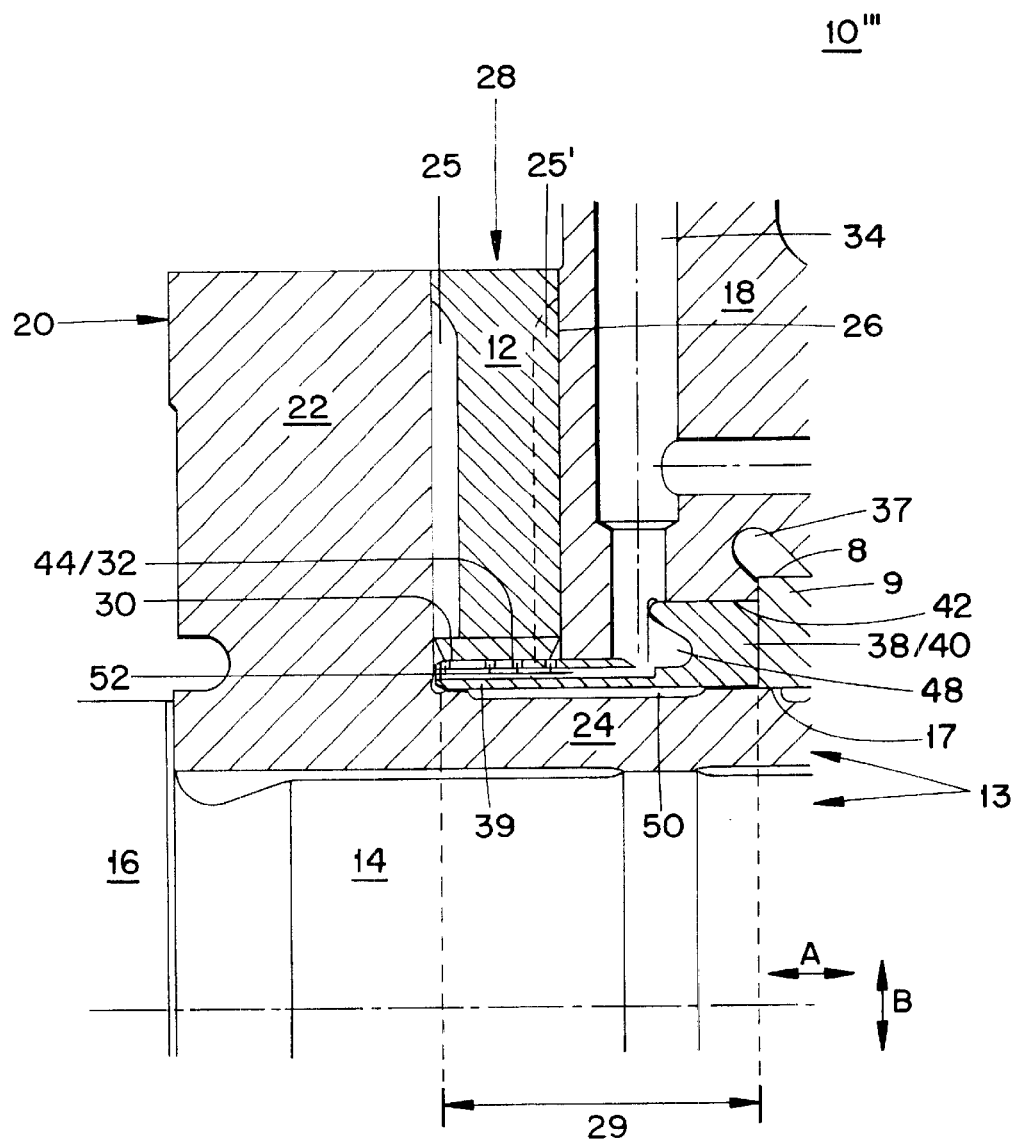

FIGS. 2 to 5 show various embodiments of the hydrodynamic axial bearing 10', 10", 10''', 10'''' according to the invention, with a basic structure corresponding to that of the axial bearing 10 known from FIG. 1. In contrast to the axial bearing 10 shown in FIG. 1, in FIGS. 2 to 5 the floating disk 12 is radially mounted with its central circular orifice 30 on a fixed bearing element 38 instead of on the rotating body 13. In FIGS. 2 to 4, the bearing body 18 is manufactured as a casting; the bearing element 38 is manufactured from steel and is provided with a wear-resistant coating or surface treatment. The bearing element 38 is connected fixedly to the bearing body 18 and has a cylindrical bearing part 39 extending in the axial direction (A) and also an essentially circular-disk-shaped fitting part 40 which projects radially outwards from the bearing part 39 perpendicularly with respect to the axial direction (A). A recess 42 in the bearing body 18, said recess being directly adjacent to the radial bearing recess 8 of the bearing body 18, forms a press seat for the fitting part 40 of the bearing element 38. The bearing part 39 of the bearing element 38 extends from the fitting part 40 axially through the annular-groove-shaped space 28 as far as the projection 22 of the bearing collar 20. The bearing element 38 thus, on a portion 29, concentrically surrounds the rotating body 13 of the axial bearing 10 and in the portion 29 forms, with said body, an uncoupling gap 50.

In FIG. 2, the bearing element 38 is designed as a closed bush 36 and the uncoupling gap 50 as an air-filled or oil-filled tolerance gap. Lubrication in the floating disk 12 and the bearing element 38 takes place by means of lubricating oil which is fed to the annular-groove-shaped space 28 via the radial feed duct 34 and the annular duct 35 connected to the latter. The radial bearing 32 integrated into the floating disk 12 is designed in such a way that it allows the lubricating oil to pass through into the lubricating-oil gap 25 between the floating disk 12 and the projection 22.

The hydrodynamic axial bearing 10" shown in FIG. 3 is designed in a similar way to the axial bearing 10' illustrated in FIG. 2. The radial mounting of the floating disk 12 takes place, again, on a fixed bearing element 38. In this example, however, the fitting part 40 of the bearing element 38 has a recess 48 which allows an easier fit into the press seat formed by the recess 42 in the bearing body 18 and prevents excessive deformation of the bearing element 38. Moreover, in the example shown here, the annular recess 48 is connected to the feed duct 34 or the annular duct 35 and at the same time serves as a lubricating-oil reservoir for oil lubrication in the annular-groove-shaped space 28. In this example, instead of the circular orifice 30 of the floating disk 12, that outer face 44 of the bearing part 39 of the bearing element 38 which confronts the floating disk 12 is designed as a radial bearing 32. The supply of lubricating oil to the lubricating-oil gap 25' formed between the floating disk 12 and the projection 22 is also ensured via the profiled outer face 44 of the bearing part 39.

The axial bearing 10''' in FIG. 4 is constructed identically to the axial bearing 10" shown in FIG. 3. The supply of lubricating oil to the radial bearing 32 of the floating disk 12 and to the lubricating-oil gaps 25, 25' is ensured by means of connecting orifices 52 which are provided in the bearing part 39 of the bearing element 38 and connect the annular-groove-shaped space 28 to the feed duct 34 for the lubricating oil.

Figure 5:
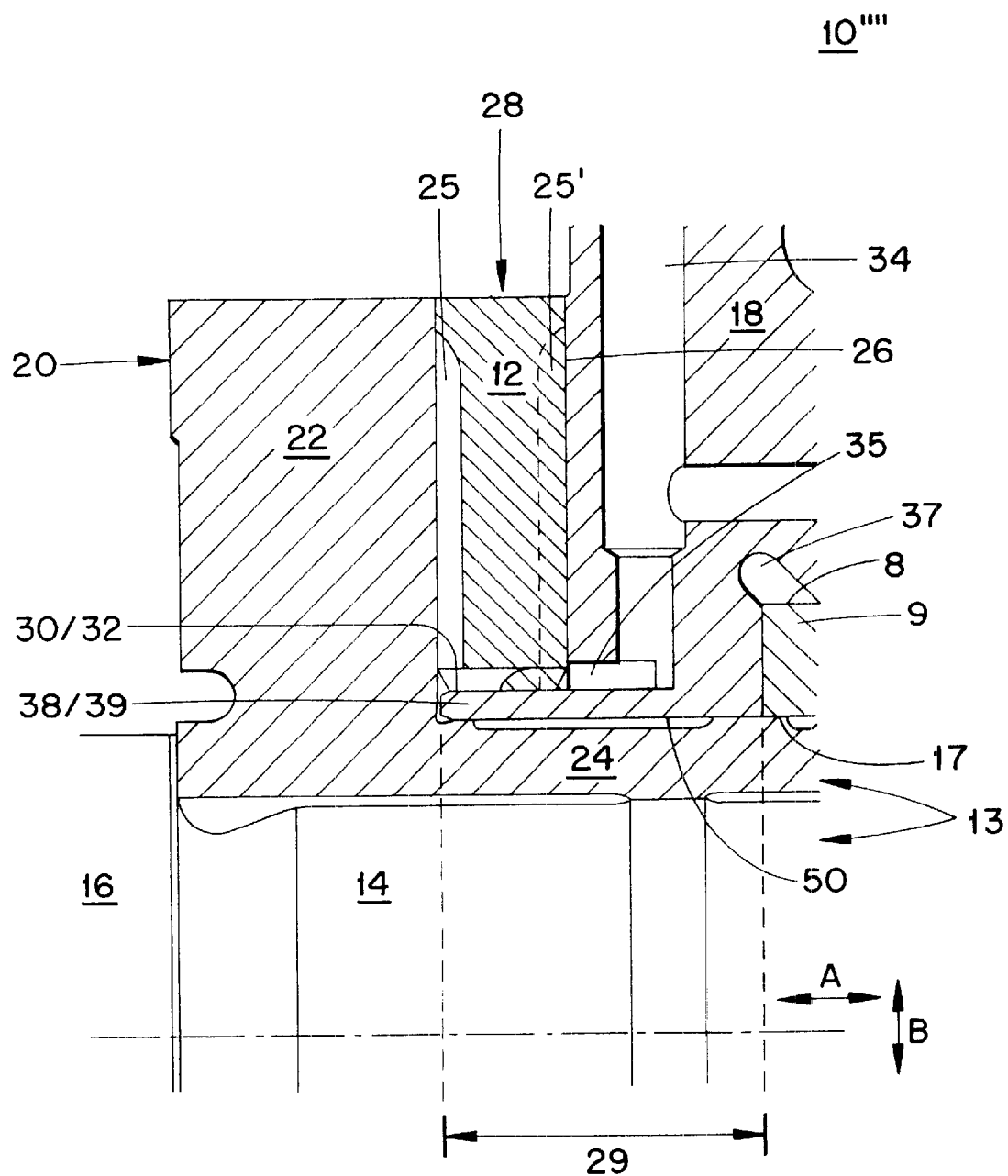

FIG. 5 shows an axial bearing 10'''' which is constructed in a similar way to the axial bearing 10' from FIG. 2. The only difference is that the bearing element 38 and the bearing body 18 are formed in one piece, in this example from steel. The exemplary embodiments shown in FIGS. 3 and 4 may, of course, also be produced in the form of bearing elements 38 connected in one piece to the bearing body 18.

Moreover, a wide variety of other designs of the axial bearing 10', 10", 10''', 10'''' is possible. For example, connecting orifices 52 may be provided in addition to the lubricating-oil supply shown in FIGS. 2 to 4. The rotating body 13 of the hydrodynamic axial bearing 10', 10", 10''', 10'''' may consist, for example, on the portion 29, only of the shaft 16 or of the shaft journal 14. Also, instead of the bearing collar 20 with its part 24 and with the projection 22, further elements corotating with the shaft 16 may be provided. The projection 22 of the bearing collar 20 may also be provided without the axial part 24. The projection 22 may also be produced in one piece with the shaft 16 or with the shaft journal 14. The bearing element 38 may be designed, for example, without a fitting part projecting radially outward, so as to be more or less tubular, and may be connected fixedly to the bearing body 18 by means of a simple shrink fit. Other connections, such as, for example, welding, may also be envisaged. The bearing element 38 may be fixedly connected to another fixed element, such as, for example, a casing part, instead of to the bearing body 18. A recess 48 as a lubricating-oil reservoir may also be provided if this is not required for a press fit.

In the design according to the invention of the hydrodynamic axial bearing 10, the uncoupling gap 50 between the rotating body 13 and the fixed bearing element 38 prevents radial oscillations (arrow B) of the rotating body 13 from being transmitted to the radial bearing 32 of the floating disk 12. The floating disk 12 and its radial bearing 32 are not subjected to load by the oscillations and wear or even a failure of the bearing are prevented.

LIST OF REFERENCE SYMBOLS

| | |
|---|---|
| 8 | Radial bearing recess |
| 9 | Radial bearing element |
| 10 to 10"" | Hydrodynamic axial bearing |
| 12 | Floating disk |
| 13 | Rotating body |
| 14 | Bearing journal |
| 16 | Shaft |
| 17 | Radial bearing |
| 18 | Bearing body |
| 20 | Bearing collar |
| 22 | Projection |
| 24 | Part of the bearing collar |
| 25, 25' | Lubricating-oil gap |
| 26 | Wall |
| 28 | Annular-groove-shaped space |
| 29 | Portion |
| 30 | Central circular orifice |
| 32 | Radial bearing |
| 34 | Feed duct |
| 35 | Annular duct |
| 36 | Bush |
| 37 | Oil duct |
| 38 | Bearing element |
| 39 | Bearing part |
| 40 | Fitting part |
| 42 | Groove |
| 44 | Outer face |
| 48 | Recess |

-continued

LIST OF REFERENCE SYMBOLS

| | |
|---|---|
| 50 | Uncoupling gap |
| 52 | Orifice |

What is claimed is:

1. A hydrodynamic axial bearing with a bearing body, with a rotating body mounted in a radial bearing of the bearing body and having a corotating projection, and with a floating disk which is arranged in an annular-groove-shaped space between the projection and a wall of a fixed bearing body and is mounted radially via a hydrodynamic radial bearing, wherein the floating disk is mounted radially via the hydrodynamic radial bearing on a fixed bearing element which concentrically surrounds the rotating body on a portion, so that an uncoupling gap is formed in the portion between the fixed bearing element and the rotating body.

2. The hydrodynamic axial bearing as claimed in claim 1, wherein the bearing element is produced in one piece with the bearing body.

3. The hydrodynamic axial bearing as claimed in claim 1, wherein the bearing element and the bearing body are separate parts and the bearing element is connected fixedly to the bearing body via a press fit.

4. The hydrodynamic axial bearing as claimed in claim 3, wherein the bearing element has a fitting part which fits into a press seat and in which, in particular, a recess is provided, said recess also serving as a lubricating-oil reservoir.

5. The hydrodynamic axial bearing as claimed in claim 1, wherein the bearing element is a closed bush.

6. The hydrodynamic axial bearing as claimed in claim 1, wherein the uncoupling gap is an air-filled tolerance gap.

7. The hydrodynamic axial bearing as claimed in claim 1, wherein the annular-groove-shaped space and the lubricating-oil gaps arranged in it and also the radial bearing are connected to the lubricating-oil feed via the bearing element.

8. The hydrodynamic axial bearing as claimed in claim 7, wherein the two lubricating-oil gaps are connected to one another via a suitable profile on an outer face of a bearing part of the bearing element which confronts the floating disk.

9. The hydrodynamic axial bearing as claimed in claim 7, wherein the annular-groove-shaped space, the lubricating-oil gaps and the radial bearing are connected to the lubricating-oil feed via connecting orifices in the bearing element.

* * * * *